(12) United States Patent
Martucci Urdaneta et al.

(10) Patent No.: US 11,970,660 B2
(45) Date of Patent: Apr. 30, 2024

(54) MIXTURE OF COMPOUNDS, ORGANIC BASES, INORGANIC COMPOUNDS AND OXIDIZING COMPOUNDS, USED IN THE PRODUCTION, IMPROVED RECOVERY, AND PROCESSING OF LIGHT, MEDIUM, HEAVY AND EXTRA-HEAVY HYDROCARBONS AND BITUMINOUS SANDS

(71) Applicant: GLOBALQUIMICA A.L C, A, Distrito de Panamá (PA)

(72) Inventors: David de Jesus Martucci Urdaneta, Distrito de Panamá (PA); William J. Jimenez Cumare, Distrito de Panamá (PA)

(73) Assignee: GLOBALQUIMICA, LLC., Humble, TX (US)

( * ) Notice: Subject to any disclaimer, the term of this patent is extended or adjusted under 35 U.S.C. 154(b) by 882 days.

(21) Appl. No.: 15/731,328

(22) PCT Filed: Dec. 2, 2014

(86) PCT No.: PCT/PA2014/000005
§ 371 (c)(1),
(2) Date: Jan. 15, 2020

(87) PCT Pub. No.: WO2016/089230
PCT Pub. Date: Jun. 9, 2016

(65) Prior Publication Data
US 2020/0140742 A1   May 7, 2020

(51) Int. Cl.
*C09K 8/58* (2006.01)
*C09K 8/524* (2006.01)
*C10G 1/04* (2006.01)

(52) U.S. Cl.
CPC .............. *C09K 8/58* (2013.01); *C09K 8/524* (2013.01); *C10G 1/045* (2013.01)

(58) Field of Classification Search
None
See application file for complete search history.

(56) References Cited

U.S. PATENT DOCUMENTS

| | | | | |
|---|---|---|---|---|
| 3,104,706 A * | 9/1963 | Eilers | .................... | E21B 43/263 166/299 |
| 3,336,981 A * | 8/1967 | Barron | .................. | C09K 8/887 166/299 |
| 3,719,228 A * | 3/1973 | Garcia | ..................... | C09K 8/60 166/281 |
| 3,859,107 A * | 1/1975 | Garcia | ................... | E21B 43/32 106/223 |
| 4,101,426 A * | 7/1978 | Maly | ....................... | C09K 8/72 507/263 |
| 2003/0183389 A1 * | 10/2003 | Lord | ....................... | C09K 8/685 507/260 |
| 2010/0282471 A1 * | 11/2010 | Watson | ................. | E21B 43/267 166/308.1 |
| 2017/0037304 A1 * | 2/2017 | Rimassa | .................. | C09K 8/74 |

* cited by examiner

*Primary Examiner* — John J Figueroa
(74) *Attorney, Agent, or Firm* — Kenneth A. Roddy

(57) ABSTRACT

The invention relates to a chemical composition produced from mixtures of organic chemical compounds, alcohols, inorganic compounds and oxidizing compounds, by combining controlled strong acids, organic bases, oxidizing compounds, alcohols and a mixture of distilled and double-distilled fatty acids, which mixture, through the use of specific controlled pressures and temperatures, can be used for the production, improved recovery and processing of light, medium, heavy and extra-heavy hydrocarbons and bituminous sands at the surface or from a deposit.

4 Claims, No Drawings

MIXTURE OF COMPOUNDS, ORGANIC BASES, INORGANIC COMPOUNDS AND OXIDIZING COMPOUNDS, USED IN THE PRODUCTION, IMPROVED RECOVERY, AND PROCESSING OF LIGHT, MEDIUM, HEAVY AND EXTRA-HEAVY HYDROCARBONS AND BITUMINOUS SANDS

CROSS-REFERENCE TO RELATED APPLICATION

This is a PCT 371 National Stage Patent Application of International PCT Application No. PCT/PA2014/000005, naming as inventors David de Jesus Martucci Urdanetta and William J. Jimenez Qumare, and filed on Dec. 2, 2014.

BACKGROUND OF THE INVENTION

For more than 80 years, the oil industry has used aliphatic solvents of fossil origin (naphtha, kerosene or diesel) and aromatic hydrocarbons to reduce or disperse the content of asphaltenes and paraffins in heavy and light crude oil that affect the operational continuity of oil wells. On the other hand, and in the specific case of heavy, extra-heavy hydrocarbons and bituminous sands the petroleum industry seeks with their use, the reduction of viscosity or increase in density or API grades (API°) of these hydrocarbons to facilitate its mobilization and transport but without altering the rest of the properties of the original oil, extracted from the deposit. In these heavy crudes, we also use the caloric energy to facilitate their handling and mobilization. Today, in addition to the conventional drilling of oil wells in deposits with adequate porosity has been added the alternative drilling technology with hydraulic fracturing (fracking) which can be used in deposits of low porosity that makes inaccessible hydrocarbons embedded in that kind of rock accessible. Hydraulic fracturing technology has allowed oil and gas to be extracted from these shale rocks and thus the emergence of a growing volume of high-paraffin light hydrocarbons that hinder the operational continuity of new oil wells and the release of vast carbon dioxide content ($CO_2$) and hydrogen sulfide ($H_2S$) that threaten the environment. This fracturing technology has been developed rapidly over the last 12 years but before the flooding of the light oil production market with hydraulic fracturing, the accelerated onset of progressive depletion is in progress. From the deposits of conventional (with porosity) of light and medium hydrocarbons and the discovery of new reserves of heavy and extra-heavy oil and the need to exploit the vast tar sands deposits of Canada and Venezuela. The handling of these heavy hydrocarbons, has accentuated the need to use fossil-based solvents to improve, in these heavy hydrocarbons, the production, recovery, treatment, mobilization, transport, and processing. These fossil-based solvents also include, the use of raw light oil as diluent and which is mixed with heavy and extra-heavy hydrocarbons to facilitate their handling. The use of these fossil-based solvents helps in the dispersion of the paraffin and asphaltene content and allows to reduce the viscosity through the dilution they exert in the heavy oil. The practice of mixing, light petroleum with heavy hydrocarbons allows oil producers, the sale and processing of heavy and extra-heavy oil but at a high cost of sacrificing light oil of higher quality and price in the market. Then, with the purpose of achieving independence from the use of light solvents and crudes of fossil origin, a chemical process has been designed to obtain a non-fossil based chemical compound, as an alternative for the improved recovery of crude oil from the site as well as for the integral improvement of the physical-chemical properties of heavy, extra-heavy petroleum and tar sands as well as the treatment of reduction of the paraffin and asphaltene content as well as the reduction of the high levels of carbon dioxide ($CO_2$) and hydrogen sulfide ($H_2S$) and thereby reduce the impact on the environment. The compound, does not use in its composition, any solvent of fossil origin. It induces a chemical reaction when it is homogenized with oil. The compound is totally incorporated into the hydrocarbon, thus achieving a new crude oil of better quality and new physicochemical properties apart from inducing chemical reactions that prevent the formation of organic impurities in the hydrocarbons. In the case of heavy, extra-heavy hydrocarbons and bituminous sands, it induces a reduction in content of sulfurous components, as well as carbon dioxide ($CO_2$) and hydrogen sulfide ($H_2S$), reduction of viscosity and elevation of the API Grade constituting a renewable alternative, to the use of solvents of fossil origin (non-renewable) in the petrochemical activities.

The present invention consists of a mixture of compounds, controlled strong acids, organic bases, oxidizing compounds, alcohols and a mixture of distilled and di-distilled fatty acids that, by using specific and controlled temperatures and pressures, can be used for production, improved recovery and treatment of light, medium, heavy, extra heavy hydrocarbons and bituminous sands from the reservoir to the surface. Its homogenization with oil, allows the formation of carbonium ions (a high energy entity), which is obtained through the protonation process that occurs during the reaction of the compound with crude oil. In the case of heavy, extra-heavy hydrocarbons and tar sands, this mechanism is able to shorten long chains of hydrocarbons that make them heavy, and transform them into shorter chains permanently. In the case of light and medium hydrocarbons, this mechanism of reaction of the carbonium ion occurs with the long chains of carbon atoms of the paraffins and asphaltenes of these type of hydrocarbons, shortening their chains and avoiding the crystallization and formation of deposits of the same. This change or reduction of long chains of hydrocarbons is permanent and irreversible, thus obtaining a lighter oil from heavy hydrocarbons, with new physico-chemical properties such as: change of density or increase of API grade and reduction of viscosity. Additionally, this homogenization of the compound with the oil also allows the reduction of the contents of: asphaltenes and paraffins in all hydrocarbons, both light and heavy. It also reduces sulfur compounds, heavy metals, foam, emulsions, and produces a change of the molecular weight of the hydrocarbon. In addition, both types of hydrocarbons allow the reduction in the high levels of carbon dioxide ($CO_2$) and hydrogen sulfide ($H_2S$) associated with the production of the wells of these hydrocarbons. Unlike conventional solvents, the compound formulated in this invention, can be injected in high pressure to the sand or rock of formation of the deposit, allowing it to increase the production of barrels of oil, by an improvement of the factor of recovery of the still oil embedded in the rock or reservoir sand and thereby increase improved oil recovery by eliminating reservoir damage. The improved crude oil obtained, when distilled, increases the yield of obtaining naphtha, kerosene, and diesel with a lower % of sulfur which also has a positive impact on the environment.

DESCRIPTION OF THE INVENTION

The details characteristic of the process of obtaining the chemical compound, are clearly described in the following exhibition and in the tables of analysis of the effects of the compound in different types of hydrocarbons that are accompanied. The compound of this invention is obtained from mixtures of compounds to include controlled strong acids, organic bases, oxidizing compounds, alcohols, and a mixture of distilled and double-distilled fatty acids, by using specific and controlled temperatures and pressures. The mixture of these acids is carried out in cold and their reaction processes are carried out at high temperature and pressure. The strong acids used in the mixture have the peculiarity to pass previously by a process that controls them and thus result in preventing them from being caustic, irritating or corrosive to human tissues and with minimum impact of corrosion in metals and metal alloys. The characteristic details of this novel method of production, improved recovery and treatment of light, medium, heavy, extra-heavy hydrocarbons and tar sands from the site and on the surface, are clearly appreciated in the following description.

Technical Field

The present Invention relates the use of a mixture of controlled strong acids, organic bases, oxidizing compounds, alcohols and a mixture of distilled and di-distillated fatty acids that by using specific and controlled temperatures and pressures, as an alternative for the improved recovery of crude oil from the site and surface allowing the maturation, at any temperature, of the heavy, extra-heavy oil and bituminous sands and the reduction of impurities in light and medium hydrocarbons, with which it is possible to achieve an oil with new physicochemical properties with respect to the original oil extracted from the site. This compound allows to minimize or replace the use of aliphatic solvents (naphtha, kerosene, and diesel) and the sacrifice of light petroleum of fossil origin as treatment for the improvement of API grade and reduction in the viscosity of the heavy, extra-heavy oil and bituminous sands and for the dispersion of paraffins and asphaltenes in light and medium hydrocarbons. Additionally, in both types of hydrocarbons it allows the reduction of high levels of carbon dioxide ($CO_2$) and hydrogen sulfide ($H_2S$) associated with the production of the wells of these hydrocarbons.

Best Way to Carry out the Invention

As previously indicated, the mixture of strong and inorganic acids used in the process, is previously controlled to attenuate its corrosive impact and caustic effect to organic tissue and metal. Once controlled, this acidic solution is mixed at room temperature with organic compounds, basic compounds, alcohols, and oxidizing compounds at high temperatures and pressures. Once homogenized and obtained, the mixture of the final compound is ready to be mixed directly with the light, medium, heavy, extra-heavy hydrocarbons, and bituminous sands, to begin its process of transformation into better quality oil. The compound obtained, can also be mixed with any solvent of fossil origin, which would serve as a vehicle to facilitate its performance of use for rapid penetration and homogenization with oil, contributing to make it easier the management of field operations for hydrocarbon production.

Having sufficiently described the invention, this process of chemical technology, we consider this a novel invention and therefore we claim, as our exclusive property, the content in the following clauses:

1. A chemical composition for chemical treatmenmt of the structure of hydrocarbons to improve the quality of the chemical composition of crude oil and gas, the composition for chemical treatment comprising:
    (a) hydrochloric acid (HCL) in a range of 0.1% to 10% by weight of the total mixture;
    (b) phosphoric acid ($H_3 PO_4$) in a range of 0.1% to 10% by weight of the total mixture;
    (c) distilled fatty acids selected from the group consisting of palm-oleic acid, linolenic acid, and oleic acid, in a range of 5% to 80% of the total mixture;
    (d) an organic amine base derived from ammonia ($NH_3$) in a range of 0.1% to 20% of the total mixture;
    (e) an oxidizing agent in a range of from 2% to 30% by weight of the total mixture;
    (f) an aliphatic alcohol solvent from 0.1% to 30% by weight of the total mixture;
    said composition for chemical treatment having a specific gravity of from 0.8000 to 0.8600, an API Severity @15.6° C. (60° F.) of from 33 to 48, and a dynamic viscosity @15.6° C. (60° F.) of 3 cSt to 8 cSt, and;
    said composition for chemical treatment is immiscible in water and only miscible in aliphatic hydrocarbon solvents.

2. The chemical composition for chemical treatment of the structure of hydrocarbons according to claim 1, wherein said mixture is prepared by mixing components (a) through (f):
    at a temperature of from 70° C. (158° F.) to 130° C. (266° F.); and
    a pressure of 14 PSI to 29 PSI.

3. The chemical composition for chemical treatment of the structure of hydrocarbons according to 1, wherein said hydrochloric acid is a 27% solution by weight in water.

4. The chemical composition for chemical treatment of the structure of hydrocarbons according to 1, wherein said phosphoric acid is a 85% solution by weight in water.

* * * * *